(12) United States Patent
Song

(10) Patent No.: US 6,363,840 B1
(45) Date of Patent: Apr. 2, 2002

(54) FRYER

(76) Inventor: Young Joo Song, 97-64 Eungam-Dong, Eunpyung-Ku, Seoul (KR)

( * ) Notice: Subject to any disclaimer, the term of this patent is extended or adjusted under 35 U.S.C. 154(b) by 0 days.

(21) Appl. No.: 09/925,350

(22) Filed: Aug. 9, 2001

(30) Foreign Application Priority Data

Mar. 7, 2001 (KR) .............................. 01-11853

(51) Int. Cl.[7] .......................... A47J 37/00; A47J 37/12; A47J 27/026
(52) U.S. Cl. .............................. 99/408; 99/331; 99/403; 126/376.1; 126/391.1; 210/167; 210/DIG. 8
(58) Field of Search .......................... 99/327, 330–333, 99/403–408, 410–418; 126/391.1, 350 R, 345, 392, 373.1, 375.1, 376.1; 219/438; 210/540, 167, DIG. 8; 426/231, 233, 438

(56) References Cited

U.S. PATENT DOCUMENTS

| | | | | |
|---|---|---|---|---|
| 3,646,882 A | * | 3/1972 | Keating ........................ 99/408 |
| 3,667,374 A | * | 6/1972 | Holmes ..................... 99/411 X |
| 3,685,433 A | * | 8/1972 | Cunningham ................ 99/408 |
| 3,933,645 A | * | 1/1976 | Keramidas .................. 210/305 |
| 3,937,136 A | * | 2/1976 | Cox ............................. 99/408 |
| 3,968,741 A | * | 7/1976 | Hunt ............................ 99/330 |
| 3,977,973 A | * | 8/1976 | Anderson .................... 210/167 |
| 4,068,571 A | * | 1/1978 | Cunningham .......... 210/DIG. 8 |
| 4,487,691 A | * | 12/1984 | Panora ....................... 210/167 |
| 4,489,646 A | * | 12/1984 | Schmidt et al. ............. 426/438 |
| 4,580,549 A | | 4/1986 | Sato | |
| 4,603,622 A | | 8/1986 | Beck | |
| 4,684,412 A | * | 8/1987 | Fritzsche ............... 210/DIG. 8 |
| 5,228,985 A | * | 7/1993 | Wells et al. ................ 210/167 |
| 5,452,648 A | * | 9/1995 | Hohler et al. ................. 99/408 |
| 5,632,266 A | | 5/1997 | Sato | |
| 6,131,564 A | | 10/2000 | Song | |

* cited by examiner

Primary Examiner—Timothy F. Simone
(74) Attorney, Agent, or Firm—George L. Boller

(57) ABSTRACT

The present invention relates to a fryer that can supply suitable moisture for oil therein, as well as refine the used oil conveniently. The oil contained a frying vessel can keep sufficient moisture through two connecting pipes connected with both the frying vessel and a water vessel, by sharing the water during flow or by difference of pressure of water head and oil head and the difference of specific gravity between two materials. The fryer also can refine and recycle the used oil so that the foods to be fried can be fried with fresh oil always.

5 Claims, 2 Drawing Sheets

FRYER

BACKGROUND OF THE INVENTION

This invention relates to a fryer that can supply suitable moisture for oil therein, as well as refine the used oil conveniently.

U.S. Pat. No. 4,580,549, Japanese Pat. No. 1,046,414 and Korean Pat. No. 90-271 teach a conventional fryer having a frying vessel in which frying oil and water are placed, allowing the oil to rise above the water due to the difference in specific gravity between oil and water and thus an oil bath is positioned in the upper portion of the vessel and a water bath is positioned in the lower portion of the frying vessel.

It is the ordinary method of frying with conventional fryers to heat frying oil in the upper portion of the frying vessel and put the material to be fried into the oil after the oil has been heated to appropriate temperature for frying. According to the Korean Pat. No. 90-271, one of the conventional fryers, the frying vessel has a flange at upper portion thereof and is supported in a suspended manner by a frame to constitute the fryer, and a heating device is provided extending through front and rear side walls of the frying vessel, near the boundary between oil bath and water bath.

A gas burner is set for each of the heating pipes, the rear end of each heating pipe being connected into a stack so that the flame of a burner is guided toward the stack from a combustion chamber and through each heating pipe to heat said heating pipe, thereby heating the oil in oil bath.

Also, air intake pipes are provided laterally spaced equidistant from each other, said air intake pipes being disposed below said heating pipes and extending through front and rear side walls of the frying vessel like the heating pipes.

The rear end of each said air intake pipe is connected to the stack, the interior of which is sectioned by a partition plate into two portions, said air intake pipe being communicated to the atmosphere through said stack separately from the discharge from each said heating pipe.

Water below an oil bath is intended to supply suitable moisture required during frying operation, and bits of fried batter must be settled down in the water bath to prevent oxidation of oil.

Accordingly, it is necessary to cool the area near the boundary between frying oil and water to prevent said bits of batter from floating up into the oil and to inhibit water from being overheated and causing explosion. But it has been found that using a plurality of air intake pipes to cool the boundary area between the water and the oil results in a high cost for fabrication of the fryer because these cooling pipes are each welded individually to the external wall of the oil bath.

Additionally, the plurality of the pipes makes cleaning of the interior of the frying vessel difficult because of the number and closeness of the cooling pipes to each other and to the side wall of the frying vessel itself.

Furthermore, since the cooling of the water is effected by air passing through the cooling pipes, long use of a fryer does heats indoor temperature to the degree not to ensure sufficient cooling of the water, and thereby the water in frying vessel will come to explosion, injuring a worker.

SUMMARY OF THE INVENTION

The present invention is proposed to solve the above problems, that is, to prevent water from exploding caused by overheating. Accordingly, the object of the invention is to provide a fryer that can refine used oil and make fried food be soft, slightly wet, by supplying with suitable moisture, as well as can prevent the explosion of water and oxidization of oil.

DESCRIPTION OF THE EMBODIMENT

Figure 1:
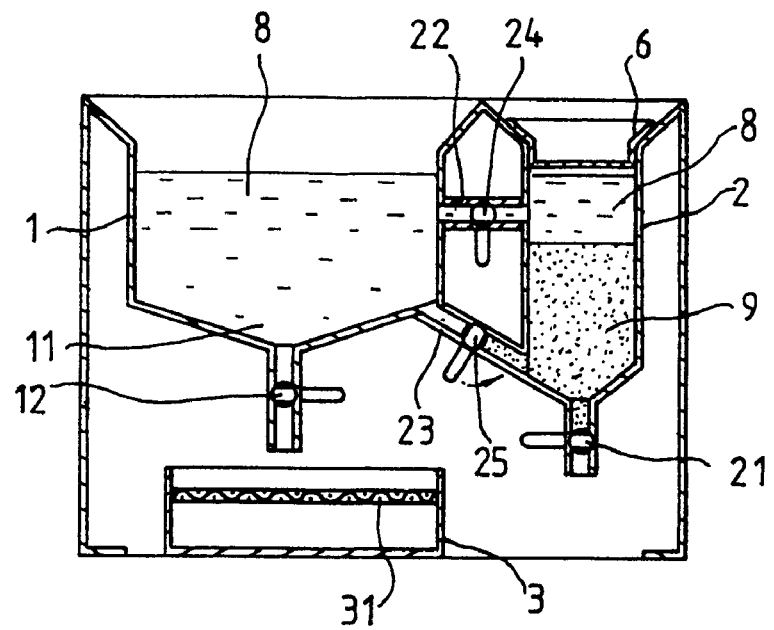
FIG. 1 is a vertical cross-sectional view of a fryer according to an embodiment of the invention.

To achieve the above object, there is provided a fryer comprising,
  at least one frying vessel which is formed open upward and tapered downward portion to provide a bottleneck-shaped accumulating portion; and
  a drain cock connected to the accumulating portion,
  and thus being able to boil the oil in the vessel,
  and being characterized in that the fryer further comprises,
    at least one water vessel arranged on said vessel to supply the inside with water, which is formed open upward and is connected to an outlet valve downward;
    a first connecting pipe connected horizontally between said frying vessel and said water vessel through a first open/close valve to control flow of the oil, by arrangement that one end of said pipe is positioned at a desired height below oil's level and the other end is positioned at the same level; and
    a second connecting pipe connected between the lower portion of said frying vessel and the lower portion of said water vessel through a second open/close valve to supply water in time.

According to another aspect of the present invention, the fryer is also characterized in that can supply water into the frying vessel while refines easily the oil through filters and the water in the water vessel, using a refinement vessel and a pump.

The invention will be described below by way of its preferred embodiments with reference to the accompanying drawings.

The fryer according to the invention is combined with a frying vessel (1) having a circular or polygonal open top and containing a frying oil, a plurality of heating pipes (not shown) extending horizontally through front and rear side walls in the middle portion of the frying vessel (1) so that the flames of burner (not shown) will be guided to heat the frying oil to a temperature suitable for frying food, or a heater (not shown) electrically connected to a power source, a bottleneck-shaped accumulating portion (11) positioned at lower portion of the frying vessel for collecting bits of fried batter, and a drain cock (12) for draining the used oil and the bits of fried batter accumulated in the accumulating portion (11).

The fryer further comprises at least one water vessel (2) for supplying water that is arranged at one side of said frying vessel. The water vessel has an open top and lower portion connected with an outlet valve. The frying and water vessels are connected with two connecting pipe, the first (22) and the second pipe (23), to supply moisture for the oil in the frying vessel.

Further, the water vessel (2) has capacity of ⅕ to ⅒ of that of the frying vessel (1). The diameter of the vessel (2) is determined by regarding the amount of the water as much that can be contained by the oil flowing through the first connecting pipe of itself (i.e. the amount escaped in vapor by heating the oil containing the water (2%~3%) by 160 to 220° C.), because it is important that the amount of the water supplied through the first and the second pipe (22 and 23) connected with the water and frying vessel (2 and 1), rather than the size of the water vessel (2). When there is insufficient water content caused heating the oil over the range, the water is supplied through the second open/close valve (25) in the second connecting pipe (23) after detecting the water deficit by using ordinary moisture determination means. The water is supplied continuously through the second connecting pipe to be contained in the oil by vaporized condition while a small amount of it is evaporated. Cycling such processes, it can be accomplished to supply suitable moisture for the oil without any explosion during supplying the water.

It may also be possible that auxiliary means (6), such as a net, is mounted on the upper portion of the water vessel (2) to support fried foods or various sauce, if required.

The first connecting pipe (22) is combined with the frying vessel (1) at the position of 10 to 15 cm below the oil's level and with the water vessel (2) at the same level. The water contained therein is maintained lower level than the height of said connecting pipe (22) so that the oil in the frying vessel (1) is not prohibited from flowing. In case that fresh oil is supplied, there is sufficient moisture in the oil. Then it is not necessary to flowing of the oil, and thus the first open/close valve (24) may be closed.

The second connecting pipe (23) is arranged to connect the lower portion of the frying vessel (1) with the lower portion of the water vessel (2), but it is tilted so that the water flows in the oil (8) in the frying vessel (1) by the difference of pressure of water head and oil head, and the difference of specific gravity between two materials. Therefore it may be accomplished to supplying moisture for the oil through the second open/close valve (25) interposed at the middle of the second connecting pipe (23). The valve is opened selectively when it is insufficient to be supplied moisture for the oil (8) by the flowing of the oil through the first connecting pipe (22), so as to supply the water for the oil.

Figure 2:
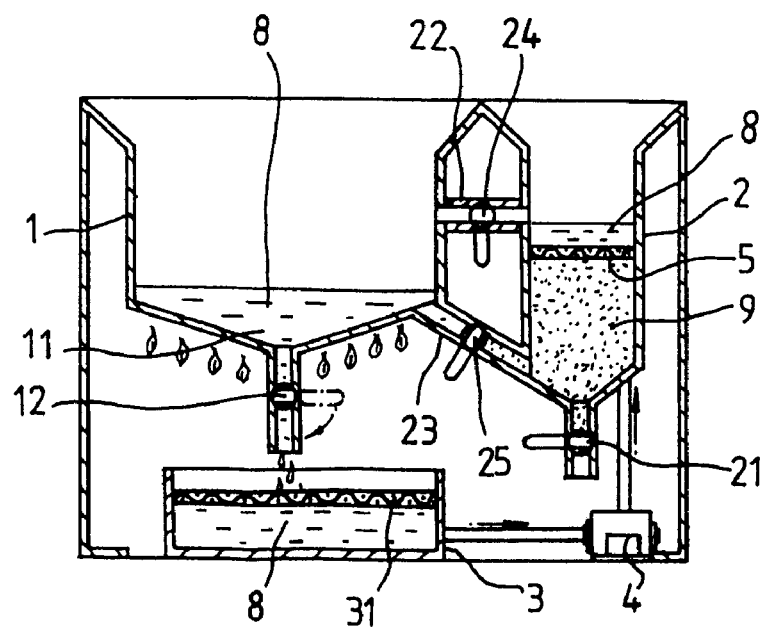
FIG. 2 is a vertical cross-sectional view of a fryer according to another embodiment of the invention, which is in state of refining automatically the oil.

In order to refine the used oil as well as to make the oil absorb the moisture of itself, there is further provided the refinement vessel (3) including the filter (31) arranged in the upper portion of it under the drain cock (12). The pump (4) is further arranged in the vicinity of the vessel (3) so that the oil filtered by passing the filter (31) can circulate from the refinement vessel (3) to the frying vessel through the pump (4) and the water vessel (2), as shown by FIG. 2. It will also be possible that another filter (5) is mounted on middle portion of the water vessel (2). In this case, the oil filtered primarily in refinement vessel (3) is refined again during passing by the water (9). Subsequently passing through the filter (5), the oil is significantly refreshed at last. Now, the refined oil (8) is supplied for the frying vessel (1) through the first connecting pipe (22) (see FIG. 2 and 3).

Figure 3:
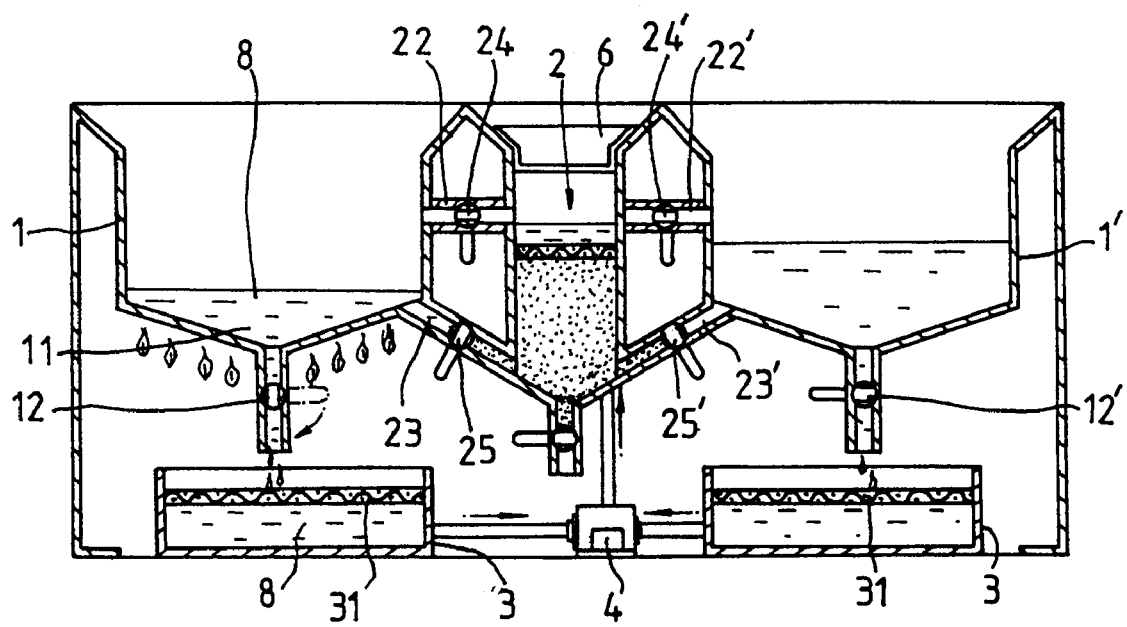
FIG. 3 is a vertical cross-sectional view of a fryer according to another embodiment of the invention, which is provided with frying vessels on the sides of a water vessel.

There may be another application of the invention that there is added another frying vessel (1') having a drain cock (12'); i.e. the fryer comprises one water vessel and two frying vessels, as shown by FIG. 3. In the same way above mentioned, the another frying vessel is connected to the water vessel through two open/close valve (24' and 25') interposed to another first and second connecting pipe (22' and 23') respectively. Consequently, more frying food can be cooked in the two frying vessels. It is further possible to be arranged four frying vessels in four directions to be supplied the suitable moisture from the water vessel (2) and to be conveniently refined the oil therein.

The open/close valves (22, 22', 24 and 24') installed in the connecting pipes (23, 23', 25, 25') may be operated with manual, or with a solenoid by electrical power.

It will be described below referencing to process that a food is cooked by the fryer according to the invention. Water is contained preferentially in the water vessel (2) until not be over the level of the first connecting pipe (22 or 22'), and oil is contained in the frying vessel(s) (1 and/or 1') over the level of the pipe. In this state, the drain cock (12), the outlet valve (21) and the second open/close valve (25) are closed while the first open/close valve (24) is open. After Fresh oil is contained over the level of the first to cover the water in the vessel, the first open/close valve (24) is closed to prevent from the flowing of the oil moreover.

It should be maintained the appropriate temperature of the oil within 160~220° C., heating it with heater such as burner.

During the oil's temperature is increased, the water in the oil is evaporated and the fried foods or various souse on the auxiliary means (6) is kept warm with appropriate temperature by heat transferred from the oil (8) and the water (9) heated by 60~70° C.

If, on continuous frying in the frying vessel (1), water contained in the oil (8) is evaporated more and more, the first open/close valve (24) of the first connecting pipe (22) is opened to flow the oil between two vessels (1 and 2). Thereby, the sharing of water is accomplished between the (dry) oil in the frying vessel (1) and the (wet) oil in the water vessel (2) which contains water by contact to the water (9). As a result, the fried foods will be soft and slightly wet, by supplying with suitable moisture, as well as the oil can be prevented oxidization.

When amount of foods to be fried at once is increased, it is necessary that the oil's temperature is increased. Since there is needed more water in the oil in the frying vessel (1) causing more water is flown in vapor, and then the second open/close valve (25) of the second connecting pipe (23) is opened. Thereby, the water (9) flows in the frying vessel (1) from the water vessel (2) by the difference of pressure of water head and oil head and by the difference of specific gravity between water and oil. When there is sufficient to supply the water in the frying vessel (1), the second open/close valve (25) is closed. In this way, it is accomplished to supply desired moisture for the oil (8).

It is possible not only that the oil in the frying vessel (1) is supplied with suitable moisture, but also that the used oil is refined or recycled after frying. In order to refining or recycling the used oil, the oil is discharged to the refinement vessel (3) by opening the drain cock (12). The oil is filtered during pass through the filter (31) in the refinement vessel (3). The oil accumulated in the vessel (3) is therefore reusable, but it is preferable that the oil in the vessel (3) is refined again through some equipment such as a pump (4). As shown by FIG. 2, by arranging a pump (4), the oil in the refinement vessel (3) flows in the water vessel (21) through a pipe. During the oil is floating on the water due to difference of specific gravity between two materials, small chips or bits of fried batter may be settle down in the water vessel (2). Further, by arranging another filter (5) in the middle of the water vessel (2), the oil is refreshed perfectly during passing through the filter (5), as well as contained appropriate moisture during passing by water. Finally the recycled oil (8) flows in the frying vessel (1) through the first connecting pipe (22). In this system, the refinement and recycling process is performed conveniently and automatically. Although there is added two or more frying vessels (1 and 1', for example) in the fryer according to the invention, as shown by FIG. 3, the oil can be refined and recycled by using one pump (4), similarly as described above.

As is clear from the foregoing, using the fryer according to the invention, the oil is prevented oxidation and from changing of color by supplying with sufficient moisture and with additional moisture, if required. Further, the fried foods can be soften and slightly wet, rather than be hardened, because they have been fried in fresh oil with appropriate moisture always.

Changes or modification may be made in the construction and the arrangement of the parts as disclosed herein without departing from the spirit and scope of the invention as defined in the following claims.

What is claimed is:

1. A fryer comprising, a frying vessel (1) which is formed open upward and tapered downward portion to provide a bottleneck-shaped accumulating portion (11); and a drain cock (12) connected to said accumulating portion (11), and thus being able to boil the oil (8) in the vessel by transferring heat to bottom or inside of said frying vessel (1), and being characterized in that the fryer further comprises, a water vessel (2) arranged on the side of said frying vessel (1) to supply the inside of said frying vessel (1) with water, which is formed open upward and is connected to an outlet valve (21) downward;

a first connecting pipe (22) connected horizontally between said frying vessel (1) and said water vessel (2) through a first open/close valve (24) to control flow of the oil, by arrangement that one end of said pipe is positioned at a desired height below oil's level and the other end is positioned at the same level; and a second connecting pipe (23) connected between the lower portion of said frying vessel (1) and the lower portion of said water vessel (2) through a second open/close valve (25) to supply water.

2. A fryer according to claim 1 further comprises, another frying vessel (1') arranged on the other side of said water vessel (2) and connected with another drain cock (12'), wherein said another frying vessel (1') is connected to said water vessel (2) through both another first connecting pipe (22') including another first open/close valve (24') and another second connecting pipe (23') including another second open/close valve (25').

3. A fryer according to claim 1 or 2, wherein all or a part of said drain cocks (12, 12'), said outlet valve (21) and said open/close valves (24, 24', 25, 25') is operated with manual or by electrical power.

4. A fryer according to claim 1 further comprises, a refinement vessel (3) arranged under said drain cock (12) of said frying vessel (1);

a filter (31) arranged in the upper portion of said refinement vessel (3); and a pump (4) is further arranged in the vicinity of the vessel (3), which is connected with both said refinement vessel (3) and said water vessel (2) so that oil flows to said water vessel (2) from said refinement vessel (3) through said pump (4).

5. A fryer according to claim 4, wherein said water vessel (2) includes another filter (5) arranged inside said water vessel (2) below the level of said first connecting pipe (22).

* * * * *